US008128986B2

(12) United States Patent
Mei et al.

(10) Patent No.: US 8,128,986 B2
(45) Date of Patent: Mar. 6, 2012

(54) METHOD FOR PRODUCING CATALYST-LAYER-SUPPORTING SUBSTRATE, METHOD FOR PRODUCING MEMBRANE-ELECTRODE ASSEMBLY AND METHOD FOR PRODUCING FUEL CELL

(75) Inventors: Wu Mei, Yokohama (JP); Taishi Fukazawa, Fuchu (JP); Takahiro Sato, Kawasaki (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 962 days.

(21) Appl. No.: 12/051,068

(22) Filed: Mar. 19, 2008

(65) Prior Publication Data

US 2008/0230171 A1 Sep. 25, 2008

(30) Foreign Application Priority Data

Mar. 20, 2007 (JP) ................................ 2007-073442

(51) Int. Cl.

| | |
|---|---|
| ***B05D 5/12*** | (2006.01) |
| ***H01M 8/10*** | (2006.01) |
| ***H01M 4/02*** | (2006.01) |
| ***H01M 4/36*** | (2006.01) |
| ***H01M 4/92*** | (2006.01) |
| ***H05K 3/46*** | (2006.01) |

(52) U.S. Cl. ........... 427/77; 429/483; 429/524; 156/150

(58) Field of Classification Search .................. 156/150; 429/483, 524, 299; 427/77
See application file for complete search history.

(56) References Cited

U.S. PATENT DOCUMENTS

| | | | | |
|---|---|---|---|---|
| 6,749,892 | B2 * | 6/2004 | Chang | 427/115 |
| 2004/0058227 | A1 * | 3/2004 | Tanaka et al. | 429/44 |
| 2008/0014495 | A1 * | 1/2008 | Saito et al. | 429/44 |

FOREIGN PATENT DOCUMENTS

| | | |
|---|---|---|
| JP | 2001-307751 | 11/2001 |
| JP | 2004-281177 | 10/2004 |
| WO | WO02/073722 | 9/2002 |
| WO | WO 2006/033253 | 3/2006 |

OTHER PUBLICATIONS

U.S. Appl. No. 11/863,798, filed Sep. 28, 2007, Mei, et al.
U.S. Appl. No. 11/863,856, filed Sep. 28, 2007, Mei, et al.
U.S. Appl. No. 12/726,638, filed Mar. 18, 2010, Mei, et al.
U.S. Appl. No. 12/121,282, filed May 15, 2008, Fukazawa, et al.
U.S. Appl. No. 12/201,332, filed Aug. 29, 2008, Tamura, et al.
Office Action issued Feb. 26, 2010, in Korea Patent Application No. 10-2008-20894 (with English-language Translation).

* cited by examiner

*Primary Examiner* — Jerry Lorengo
*Assistant Examiner* — Jennifer Smith
(74) *Attorney, Agent, or Firm* — Oblon, Spivak, McClelland, Maier & Neustadt, L.L.P.

(57) ABSTRACT

A method for producing a catalyst-layer-supporting substrate includes a lamination step of forming a laminate of metal catalyst layers and mixture layers on a substrate by repeating a first step and a second step plural times alternatively; and an acid treatment step of subjecting the laminate to an acid treatment, wherein the first step is a step of sputtering or depositing the metal catalyst layer that comprises a catalyst, and the second step is a step of sputtering or depositing the mixture layer of carbon and metal, the metal of the mixture layer including at least one element M selected from the group consisting of Sn, Al, Cu and Zn.

15 Claims, 1 Drawing Sheet

METHOD FOR PRODUCING CATALYST-LAYER-SUPPORTING SUBSTRATE, METHOD FOR PRODUCING MEMBRANE-ELECTRODE ASSEMBLY AND METHOD FOR PRODUCING FUEL CELL

CROSS-REFERENCE TO RELATED APPLICATIONS

This application is based on and claims priority under 35 USC 119 from Japanese Patent Application No. 2007-073442filed on Mar. 20, 2007. The entire disclosure of each and every foreign patent application from which the benefit of foreign priority has been claimed in the present application is incorporated herein by reference, as if fully set forth.

BACKGROUND

1. Technical Field

The present invention relates to a method for producing a catalyst-layer-supporting substrate, a method for producing a membrane-electrode assembly and a method for producing a fuel cell.

2. Related Art

Polymer electrolyte fuel cells, in particular, methanol-typed polymer electrolyte full cells which use a methanol solution as a fuel can operate at low temperatures and are small in size and light in weight. Therefore, applications of them to a power supply for mobile devices have been researched and studied in recent years. The performance of conventional fuel cells has, however, not reached a level which enables a wide propagation thereof. Since fuel cells change chemical energy to electric power through an electro-catalysis reaction, highly active catalysts are vital to the development of high-performance fuel cells.

PtRu is generally used as an anode catalyst of a fuel cell. A voltage loss by the PtRu catalyst is about 0.3 V relative to a theoretical voltage of 1.2 V which is obtained by the electro-catalysis reaction, and there exists a need for obtaining a highly active (methanol oxidation activated) anode catalyst which surpasses PtRu. There have been carried out various studies on improvement in methanol oxidation activity which includes the addition of other elements to PtRu, and reports thereof are available.

As a conventional catalyst synthesis method, the solution methods have been generally adopted in which solutions of basic salts are used to synthesize a catalyst through impregnation, precipitation, and liquid-phase reduction. With the solution methods, however, there exists an inherent problem that the control of a surface of a catalyst is difficult with respect to elements which are difficult to be reduced and elements which are difficult to be alloyed.

On the other hand, a catalyst synthesis using the sputtering method or deposition method is advantageous in the aspect of controlling materials, and the inventor et al have found out a highly active catalyst through the sputtering or deposition process. When preparing a catalyst using the conventional sputtering method or deposition method, however, there still exists a problem of controlling the catalyst layer pore structure, and hence, it is desired to improve the preparation process and increase further the properties of fuel cells and the utilization efficiency of noble metals. For example, in an anode electrode, the utilization efficiency of a catalyst largely depends on the density of a three-phase interface in fuel/catalyst/proton conductive material. Due to this, in order to obtain sufficient fuel cell properties, it is necessary to control the pore structure of a catalyst layer and increase the density of the three-phase interface.

There have been disclosed some catalyst layer forming methods using the sputtering process until now. For example, it is reported in JP-A 2001-307751 (KOKAI) that catalyst layers and carbon are sputtered simultaneously or sequentially on to an electrolytic membrane. It is reported in WO 2002/073722 that a laminated structure made up of carbon powder and a catalyst is formed on an electrode substrate by a method including a vapor phase deposition process. It is reported in JP-A 2004-281177 (KOKAI) that a two-layer catalyst structure is formed by sputtering Si before a catalyst is sputtered, and this process is said to be effective in suppressing the growth of particles of a catalyst. However, it cannot be said that these processes are good enough to improve the catalyst layer pore structure, and hence, there is a demand for development of new processes.

SUMMARY

According to an aspect of the invention, there is provided a method for producing a catalyst-layer-supporting substrate, including: a lamination step of forming a laminate of metal catalyst layers and mixture layers on a substrate by repeating a first step and a second step plural times alternatively; and an acid treatment step of subjecting the laminate to an acid treatment, wherein the first step is a step of sputtering or depositing the metal catalyst layer that comprises a catalyst, and the second step is a step of sputtering or depositing the mixture layer of carbon and metal, the metal of the mixture layer comprising at least one element M selected from the group consisting of Sn, Al, Cu and Zn.

DETAILED DESCRIPTION

The inventors have researched and studied catalyst synthesis processes earnestly. As a result, it has been found out that the catalyst layer structure can be controlled by forming a laminated material by sputtering or depositing a plurality of times alternately a metal catalyst layer and a mixture layer which contains carbon and an element M (at least one kind of element which is selected from a group of Sn, Al, Cu and Zn, hereinafter, referred to as an element M or an M metal) and thereafter, performing an acid treatment on the laminated material so formed, whereby a catalyst-layer-supporting substrate can be obtained which can prevent the aggregation of catalyst fine particles.

Hereinafter, embodiments of the invention will be described.

Figure 1:
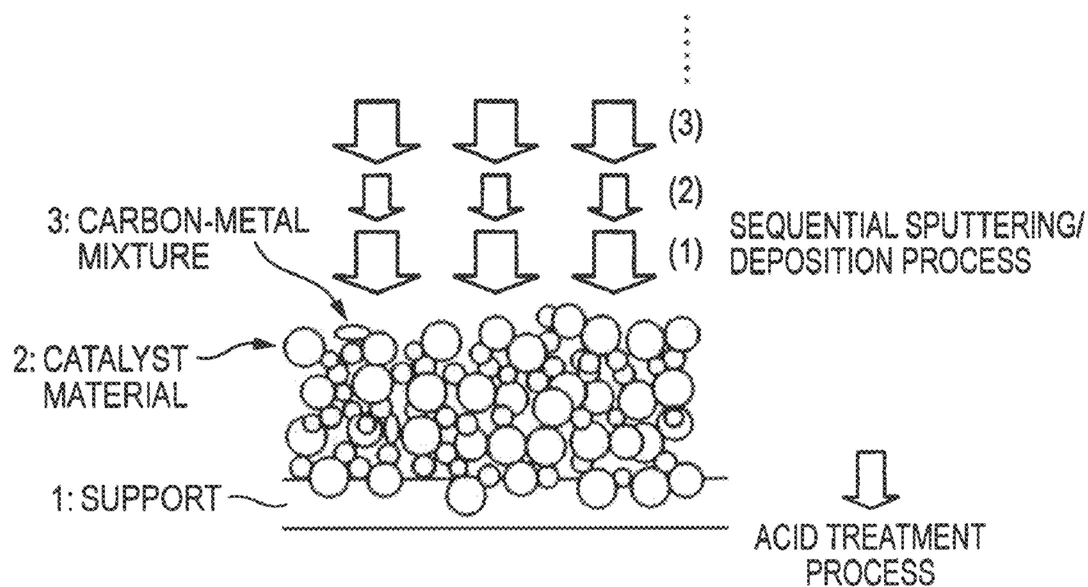
FIG. 1 is an exemplary diagram of a catalyst synthesis process according to an embodiment of the invention.

In an embodiment of the invention, as is shown in FIG. 1, a multilayered catalyst layer structure is prepared on a support (a substrate) 1 which is a catalyst support by laminating a catalyst material (a metal catalyst layer) 2 and carbon and the aforesaid M metal (a mixture layer) 3 alternatively, that is, by repeating (1) a sputtering or depositing of the catalyst material, (2) a sputtering or depositing of carbon and the M metal, (3) a sputtering or depositing of the catalyst material, . . . plural times alternatively. Thereafter, the catalyst layer structure is subjected to an acid treatment so as to form a porous catalyst layer structure having a suitable pore structure.

The catalyst material 2 is not limited as long as it has good catalyst activity, electron conductivity and stability and for example, a noble metal-based catalyst can be used as the catalyst material 2. The noble metal-based catalyst means a catalyst which uses a noble metal element such as Pt, Ru, Rh, Os, Ir, Pd and Au. When such a noble metal-based catalyst is used on an anode, a composition indicated, for example, as $Pt_yRu_zT_{1-y-z}$ can be used for the noble metal-based catalyst. Here, y is $0.2 \leqq y \leqq 0.8$, z is $0 \leqq z \leqq 0.5$, and the element T is at least one kind of element which is selected from a group of W, Hf, Si, Mo, Ta, Ti, Zr, Ni, Co, Nb, V and Cr. In addition, when the noble metal like this is used on a cathode, a composition indicated, for example, as $Pt_uT_{1-u}$ can be used for the noble metal-based catalyst. Here, u is $0.2 \leqq u \leqq 0.75$, and the element T is at least one kind of element which is selected from a group of W, Hf, Si, Mo, Ta, Ti, Zr, Ni, Co, Nb, V and Cr. However, catalysts do not have to be limited to the catalysts described above, and hence, an oxide-based catalyst, a nitride-based catalyst and a carbide-based catalyst may be used.

Carbon and the M metal 3 are important to form a suitable catalyst layer by suppressing the growth of catalyst particles and controlling the catalyst pore structure. Carbon is considered to be effective in forming a suitable pore structure, suppressing the growth of catalyst particles and maintaining electron conductivity. Carbon does not experience a change in crystalline state as a result of acid treatment and can form a suitable pore structure to thereby improve the durability of a porous catalyst layer structure. There is imposed no limitation on the crystalline state of carbon, and carbon in an amorphous or crystalline state can be formed by changing substrate temperature and sputtering rate in a sputtering/deposition process. When a crystalline carbon is used, there is also provided an advantage that the electron conductivity and stability of carbon can be increased. As the element M, at least one kind of element which is selected from a group of Sn, Al, Cu and Zn can be used. As the targets, a multi metal alloy target may be used, or targets of respective metals may be sputtered simultaneously. Part or the whole of the M metal is removed as a result of the acid treatment being carried out after the laminated catalyst structure was prepared, which is important to the formation of a suitable pore structure. In the event that a portion of the M metal is left not removed after the acid treatment, a stable oxide is formed, which is considered to contribute to the supply of fuel for a catalyst reaction. Namely, in the event that this occurs in the anode, the supply of water is promoted, while in the event that occurs in the cathode, the supply of oxygen is promoted. The element M contents in the carbon-metal mixture is preferably made to be in the range of 20 to 90 at. % or less. It is possible to obtain an advantage that pores of a more suitable size can be obtained in a more suitable amount by making the element M contents be 20 at. % or more. In addition, by making the element M contents be 90 at. % or less, it is possible to obtain an advantage that the strength of the porous catalyst layer structure is increased, so as to increase, in turn, the long-term durability. In the embodiment, the contents of the element M in the carbon-metal mixture is more preferably in the range of 25 to 80 at. %.

As the substrate 1, an electron conductive substrate material or a proton conductive substrate material can be used.

The electron conductive substrate material includes, for example, a porous paper containing electron conductive carbon fibers, but is not limited thereto, and hence, any supports can be used as long as they have good electron conductivity and stability as the electron conductive substrate material. In addition to the carbon materials, a porous ceramic substrate having electron conductivity may be used as the electron conductive substrate material. Additionally, the catalyst and the mixture of carbon and the M metal are sputtered alternately on the substrate, and thereafter, the substrate so prepared may be transferred on to any other porous material or an electrolyte membrane.

The proton conductive substrate material includes, for example, a fluorine-based electrolyte membrane, a hydrocarbon-based electrolyte membrane and an electrolyte membrane which is made up of a composite oxide having superstrong acidity, but is not limited thereto, and hence, any materials can be used as long as they have proton conductivity. In the event that a porous catalyst layer structure is prepared in a proton conductive substrate material, it is necessary to adjust a parameter such as substrate temperature at the time of sputtering or deposition in consideration of the thermal stability of the proton conductive substrate material.

The sputtering or deposition on to the substrate 1 can be performed in the following manner.

When sputtering or depositing the catalyst material 2, a multi metal alloy target may be used, or a sputtering or deposition which uses targets of respective metals may be performed. For example, a sputtering or deposition rate of 0.5 to 100 nm/min can be used. It is desirable that the support temperature is set to 400° C. or less during sputtering. In the case of a temperature being higher than that temperature, a phase separation is caused in catalyst particles, and the catalyst activity may be unstable. In addition, in order to reduce costs necessary to cool the support, a lower limit of the support temperature is desirably set to 10° C.

The mixture layer 3 of carbon and the M metal can be formed through simultaneous sputtering or simultaneous deposition using carbon and the M metal as targets, respectively. In addition, a mixture target of carbon and the M metal may be used. In either case, a sputtering or deposition parameter for sputtering or depositing carbon and the M metal or a composition for the mixture target needs to be taken into consideration according to a target composition for the mixture layer. For example, since the sputtering or deposition rate of carbon is slower than that of metal, the carbon contents of the mixture target needs to be set higher than the target composition of the mixture layer.

The sputtering or deposition of the metal catalyst layer 2 and the mixture layer 3 of carbon and the M metal is repeated in an alternate fashion so that the metal catalyst layer 2 and the mixture layer 3 are each accumulated in five or more layers and 100 or less layers in order to secure a sufficient catalyst quantity. By accumulating each of the metal catalyst layer 2 and the mixture layer 3 in five or more layers, an advantage can be provided that the suppression of particle growth of catalyst particles is easily made compatible with the increase in catalyst loading quantity. In addition, by accumulating each of the metal catalyst layer 2 and the mixture layer 3 in 100 or less layers, an advantage can be obtained that the control of the fine pore structure is facilitated. Although a sputtering quantity of the catalyst layer 2 sputtered during a single sputtering action depends on the catalyst composition, the sputtering quantity during a single sputtering action is preferably set to be in the range of 5 to 100 nm when expressed in terms of thickness. With a sputtering quantity of 5 nm or more, an advantage can be obtained that the loading quantity is increased. In addition, with a sputtering quantity of 100 nm or less, an advantage can be obtained that the suppression effect of particle growth is increased. A more preferable thickness for the catalyst layer 2 is in the range of 10 to 50 nm. Although a sputtering quantity of the mixture layer 3 of carbon and the M metal sputtered during single sputtering action depends on operating conditions of a fuel cell, the sputtering quantity during a single sputtering action is preferably set to be in the range of 10 to 150 nm when expressed in terms of thickness. With a sputtering quantity of 10 nm or more, an advantage can be obtained that the control of the fine pore structure is facilitated. In addition, with a sputtering quantity of 150 nm or less, an advantage can be obtained that the loading density is increased. A more preferable thickness for the mixture layer 3 is in the range of 20 to 100 nm.

In addition, according to an embodiment of the invention, by adjusting the sputtering quantities of the catalyst and the carbon-metal mixture, a porous catalyst layer can be prepared which has a gradient structure having a composition gradient or a porosity gradient. Specifically, the utilization efficiency of catalyst can be increased, for example, by increasing the catalyst contents on the proton conductive substrate material side while decreasing the porosity.

When performing an acid treatment in an embodiment of the invention, for example, nitric acid, hydrochloric acid, sulfuric acid or a mixture thereof is used, and the relevant treatment can be performed for a period of time in the range of five minutes to in the order of two hours. As this occurs, the acid treatment may be carried out while heating the acid treatment agent to temperatures ranging from 50 to in the order of 100° C. By performing the acid treatment, part of the whole of the M metal is dissolved to thereby form pores. In addition, as required, a bias voltage is applied to promote the dissolving of the M metal or a post treatment such as heat treatment may be added.

The existence of pores in the catalyst layer as a result of the acid treatment can be grasped by a TEM observation. It is found out through TEM observation that the size of pores in the catalyst layer of the invention is in the range of 1 to in the order of 100 nm and the voids are in the range of 5 to in the order of 50%.

A membrane-electrode assembly according to an embodiment of the invention includes a pair of electron conductive substrate materials (an anode and a cathode) and a proton conductive substrate material (a proton conductive membrane) which is interposed between the anode and the cathode. In addition, a fuel cell according to the invention is such as to include the membrane-electrode assembly. A catalyst-layer-supporting substrate according to an embodiment of the invention may be used on at least either of the anode and the cathode also in a configuration which will be described later.

Figure 2:
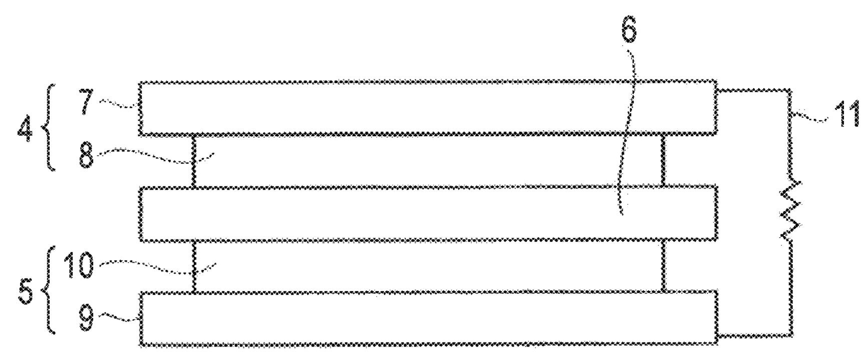
FIG. 2 is a side view showing exemplarily a fuel cell according to an embodiment of the invention.

A membrane-electrode assembly (MEA), as is shown in FIG. 2, includes an anode 4, a cathode 5 and a proton conductive membrane 6. The anode 4 includes a diffusion layer 7 and an anode catalyst layer 8 which is laminated on the diffusion layer 7. The cathode 5 includes a diffusion layer 9 and a cathode catalyst layer 10 which is laminated on the diffusion layer 9. The anode 4 and the cathode 5 are laminated in such a manner that the anode catalyst layer 8 and the cathode catalyst layer 10 face each other via the proton conductive membrane 6. Note that in FIG. 2, reference numeral 11 denotes an exterior circuit.

The substrate 1 can be used for the diffusion layer 7, while the porous catalyst layers 2, 3 can be used for the anode catalyst layer 8. The noble metal-based catalyst can, for example, be used as an anode catalyst. On the other hand, the substrate 1 can also be used for the diffusion layer 9, and the porous catalyst layers 2, 3 can also be used for the cathode catalyst layer 10. Pt can, for example, be used for a cathode catalyst. While the cathode catalyst may be made to be carried on a support, it can be used as it is without being carried on a support.

An electron conductive porous sheet can e used for the diffusion layers 7, 9. A sheet of paper which is made of a material such as carbon cloth and carbon paper which is permeable to air/gas or liquid can be used for the electron conductive porous sheet.

The proton conductive substance contained in the anode layer, the cathode layer and the proton conductive membrane is not limited and any substances can be used as long as they can conduct protons. The proton conductive substance, for example, includes fluorine resins having a sulfonic group such as Nafion (produced by DuPont), Flemion (produced by Asahi Kasei) and Aciplex (produced by Asahi Kasei), and inorganic substances such as tungstic acid and phosphotungstic acid.

The MEA is not limited to the form described above. For example, the MEA may be configured so as to include an anode, a cathode and a proton conductive membrane which is provided between the anode and the cathode, with an anode catalyst layer provided on an anode side and a cathode catalyst layer provided on a cathode side of the proton conductive membrane. In this case, the substrate 1 can be used as the proton conductive membrane, and the porous catalyst layers 2, 3 can be used as the anode catalyst layer. The noble metal-based catalyst can be used as an anode catalyst. In addition, the porous catalyst layers 2, 3 can also be used for the cathode catalyst layer. For example, Pt can be used for a cathode catalyst. While the cathode catalyst may be made to be carried on a support, it can be used as it is without being carried on a support. In this case, the proton conductive membrane includes, for example, a fluorine-based electrolyte membrane, a hydrocarbon-based electrolyte membrane and an electrolyte membrane which is made up of a composite oxide having superstrong acidity, but is not limited thereto, and hence, any materials can be used as long as they have proton conductivity.

A fuel cell according to an embodiment of the invention includes the MEA that has been described above, a unit that supplies fuel to the anode and a unit that supplies an oxidizing agent to the cathode. The number of MEAs used may be one or a plurality of MEAs may be used. A high electromotive force can be obtained by using a plurality of MEAs. As fuel, methanol, ethanol, formic acid or an aqueous solution containing one or more matters selected from those can be used.

Hereinafter, examples of the invention will be described, but the invention is not limited to the examples to be described below.

EXAMPLES 1 TO 10

A laminated structure of anode catalyst layers 2 and carbon-metal mixture layers 3 was formed by repeating alternately a sputtering of target 1 which contained a catalyst metal as shown in Table 1 and a simultaneous sputtering of a target 2 which contained the element M and a target 3 which contained carbon on a substrate 1 which used a carbon paper (marketed under a trade name of Toray 060) using a magnetron sputtering apparatus. The thickness of the catalyst layer, the thickness of the carbon-M mixture layer and the number of times of repetitions are shown in Table 1.

EXAMPLE 11

A laminated structure of anode catalyst layers 2 and carbon-metal mixture layers 3 was formed by repeating alternately a sputtering of a target 1 which contained a catalyst metal as shown in Table 1 and a sputtering of a mixture target 2 of carbon and the M metal using a carbon paper (marketed under a trade name of Toray 060) as a substrate 1 by a magnetron sputtering apparatus. The thickness of the catalyst layer, the thickness of the carbon-M mixture layer and the number of times of repetitions are shown in Table 1.

EXAMPLES 12 TO 13

A laminated structure of anode catalyst layers 2 and carbon-metal mixture layers 3 was formed by repeating alternately a sputtering of target 1 which contained a catalyst metal as shown in Table 1 and a simultaneous sputtering of a target 2 which contained the element M and a target 3 which contained carbon on a substrate 1 which used a carbon paper (marketed under a trade name of Toray 060) using a magnetron sputtering apparatus. The thickness of the catalyst layer, the thickness of the carbon-M mixture layer and the number of times of repetitions are shown in Table 1.

EXAMPLE 14

An anode catalyst layer 2 and a carbon-metal mixture layer 3 were formed by repeating alternately a sputtering of a target 1 which contained a catalyst metal as shown in Table 1 and a simultaneous sputtering of a target 2 which contained the element M and a target 3 which contained carbon using a carbon paper (marketed under a trade name of Nafion 115 from DuPont). Thereafter, a sputtering of the target 1 which contained the catalyst metal and a simultaneous sputtering of the target 2 which contained the element M and the target 3 which contained carbon were repeated on a back side of the membrane under the same conditions as Example 12, whereby a cathode catalyst layer and a carbon-metal mixture layer were formed. A laminated structure of anode catalyst layers 2 and carbon-metal mixture layers 3 was formed by repeating alternately a sputtering of target 1 which contained a catalyst metal as shown in Table 1 and a simultaneous sputtering of a target 2 which contained the element M and a target 3 which contained carbon on a substrate 1 which used a carbon paper (marketed under a trade name of Toray 060) using a magnetron sputtering apparatus. The thickness of the catalyst layer, the thickness of the carbon-M mixture layer and the number of times of repetitions are shown in Table 1.

COMPARISON EXAMPLE 1

An anode catalyst layer was formed by performing a sputtering using a target 1 which contained a catalyst metal as shown in Table 1 using a carbon paper (marketed under a trade name of Toray 060) as a substrate 1 by a magnetron sputtering apparatus so that the thickness of a catalyst layer became 300 nm.

The substrates and the laminated structures thereon of Examples 1 to 14 and Comparison Example 1 were thereafter put in a 50 percent by weight of nitric acid at 60° C. for 24 hours for an acid treatment, rinsed with pure water and dried. The catalyst loading quantity of the porous catalyst layer structures so prepared was about 0.36 mg/cm$^2$.

COMPARISON EXAMPLE 2

A cathode electrode was prepared using a similar method to that in Example 1 of in WO 2002/073722 by changing only the number of catalyst layers and carbon layers laminated. The number of layers that were laminated was increased so as to obtain a catalyst loading quantity of 0.36 mg/cm$_2$. Firstly, a paint in which carbon powder (having a particle diameter of 30 to 40 nm) of 0.6 g was dispersed in an NMP (N-pyrrolidone) solvent of 40 g was initially dropped at 500 rpm for five minutes and thereafter dropped at 1000 rpm for 30 seconds by a spin coating process to thereby form a layer, and furthermore, the paint was heated and dried at 120° C. to complete the layer. Next, a current of DC1A and 420V was applied to a platinum sputter layer using platinum (Pt) targets. Then, a sputtering was carried out while rotating a substrate to thereby form a platinum catalyst layer. Note that the carbon powder was applied to realize a layer having a thickness of 300 nm by utilizing the spin coating process, so that 15 such layers were provided. In addition, the platinum (sputter) layer was prepared to have a thickness of 20 nm by employing a sputtering process, and 15 such layers were provided. The catalyst loading quantity of an electrode thus prepared was about 0.36 mg/cm$^2$, which was similar to those of Examples 1 to 14.

EXAMPLE 3

An electrode was prepared which had a similar composition to that of Example 2 of JP-A 2001-307751 (KOKAI) using a similar process to that in the same example. Firstly, a proton electrolyte membrane (Nafion 115; produced by DuPont) was left under a vacuum atmosphere for 10 minutes so as to remove water therefrom to thereby obtain a pretreated membrane. A Pt—Ru anode catalyst layer was formed on the membrane by a DC (direct current) sputtering process, and at the same time that this occurs, carbon was applied thereto by an RF (radio frequency) sputtering process. Conditions for this magnetron sputtering were as follows. A mixture gas of argon gas and helium gas (formulation ratio being 1:1) was used as a reaction gas. Furthermore, the pressure was maintained at 100 Pa, and a sputtering was carried out by a sputter gun being supplied with 300 W. In addition, a total sputtering time was 400 seconds, but in order to prevent the transmission of the temperature of targets which were overheated by a comparatively long sputtering time to a hydrogen ion exchange polymer membrane, the sputtering was divided into two portions each having a sputtering time of 200 seconds. Furthermore, a Pt cathode catalyst and carbon were simultaneously coated on a back side of the membrane to which the anode catalyst layer was coated. The pressure of the reaction gas resulting then was a total of 100 Pa which was made up of a partial pressure which was the pressure of the argon gas and a partial pressure which was the pressure of the helium gas, and a condition for the RF sputtering process was that the process was carried out with an electric power of 300 W. Loading quantities of the PtRu anode catalyst and the Pt cathode catalyst which were formed in the ways described were each 1.5 mg/cm$^2$. This is about four times as large as the catalyst loading quantities of Examples 1 to 14 and Comparison Examples 1 to 2.

Various catalyst carrying substrates (electrodes or membranes to which the catalyst layers were coated) so obtained were impregnated with a five percent by weight of Nafion (produced by DuPont) and were dried, and a proton conductive material was imparted to the catalyst layers. Examples 1 to 11 and Comparison Example 1 were made to function as anode electrodes, and the cathode electrode of Example 12 was used so as to correspond to each of those electrodes, and Examples 12 to 13 and Comparison Example 2 were made to function as cathode electrode, and the anode electrode of Example 1 was used to correspond to each of these electrodes, whereby a membrane-electrode assembly and a single cell were prepared in the following manner for evaluation.

<Preparation of Membrane-electrode Assembly>

A cathode electrode and an anode electrode were cut out in a square of 3.2×3.2 cm so as to realize an electrode area of 10 cm$^2$ both for the cathode electrode and the anode electrode, a Nafion 115 (produced by DuPont) was sandwiched between the cathode electrode and the anode electrode as a proton conductive solid polymer membrane, and a resulting assembly of the cathode electrode, the anode electrode and the proton conductive solid polymer membrane was then subjected to a thermocompression bonding at 125° C. for 10 minutes under a pressure of 30 kg/cm$^2$ to thereby prepare a membrane-electrode assembly for each of the examples and comparison examples. In Example 14 and Comparison Example 3, a proton conductive solid polymer membrane was interposed between two carbon papers (marketed under the trade name of Toray 060), and a resulting assembly of the proton conductive solid polymer membrane and the carbon papers were subjected to a thermocompression bonding at 125° C. for 10 minutes under a pressure of 30 kg/cm$^2$ to thereby prepare a membrane-electrode assembly.

A single cell of a direct-fuel-supply-typed proton exchange membrane electrolyte fuel cell was prepared using the membrane-electrode assembly prepared in the manner described above and flow path plates. As a fuel to be supplied to this single cell so prepared, a 1M methanol solution was supplied to the anode electrode at a flow rate of 0.6 ml/min, while air was supplied to the cathode electrode at a flow rate of 100 ml/min. With the cell maintained at 50° C., an electric current density of 100 mA/cm$^2$ was made to be discharged, and the voltage of the single cell resulting after 30 minutes was measured. This was carried out for each of the examples and comparison examples and the results are shown in Table 1 below.

TABLE 1

| Examples | Target 1 | Target 2 | Target 3 | Thickness of Single Catalyst Layer (nm) | Thickness of Single C Layer or C-M Element Mixture Layer (nm) | Number of Times of Repetitions (times) | C-M Mixture Layer Composition (atom %) | Single Cell Voltage (V) |
|---|---|---|---|---|---|---|---|---|
| Example 1 | PtRu | Cu | C | 20 | 50 | 15 | C30Cu70 | 0.45 |
| Example 2 | PtRu | Cu | C | 150 | 150 | 2 | C80Cu20 | 0.35 |
| Example 3 | PtRu | Cu | C | 3 | 5 | 100 | C30Cu70 | 0.36 |
| Example 4 | PtRu | Cu | C | 50 | 50 | 6 | C30Cu70 | 0.46 |
| Example 5 | PtRu | Al | C | 10 | 30 | 30 | C40Al60 | 0.49 |
| Example 6 | PtRu | Zn | C | 20 | 50 | 50 | C30Zn70 | 0.52 |
| Example 7 | PtRu | Sn | C | 20 | 50 | 50 | C20Sn60 | 0.47 |
| Example 8 | PtRuW | CuZnSn | C | 20 | 50 | 50 | C20Cu30Zn30Sn20 | 0.43 |
| Example 9 | PtRu | Cu | C | 20 | 50 | 30 | C5Cu95 | 0.35 |
| Example 10 | PtRu | Cu | C | 20 | 50 | 30 | C85Cu15 | 0.36 |
| Example 11 | PtRu | C—Cu | — | 10 | 50 | 50 | C35Cu65 | 0.48 |
| Example 12 | Pt | CuZn | C | 10 | 50 | 50 | C30Zn70 | 0.45 |
| Example 13 | PtCo | CuSn | C | 20 | 150 | 30 | Cu30Sn70 | |
| Example 14 | PtRu | CuZn | C | 30 | 60 | 20 | C20Cu40Zn40 | 0.47 |
| Comparative Example 1 | PtRu | — | — | 300 | — | 1 | — | 0.30 |
| Comparative Example 2 | PtRu | — | C | 20 | 300 | 15 | Only C | 0.33 |
| Comparative Example 3 | PtRu | — | C | — | — | — | Only C | 0.30 |

As the results in Table 1 indicate, when comparing Examples 1 to 14 with Comparison Example 1, respectively, it is seen that the single cell voltage is high and high fuel cell properties are provided by the single cells prepared according to the invention. When comparing Examples 1 to 14 with Comparison Examples 2, 3, it is seen that higher single cell voltages are obtained by the single cells prepared according to the invention than by those prepared according to the conventional process. The respective samples were subjected to TEM observation. Pores of sizes of 1 to 100 nm or larger exist in the samples prepared according to the process of the invention, while almost no pore was observed in the samples prepared according to the conventional process (Comparison Examples 1 to 3). It is considered that the higher properties of the electrodes prepared according to the invention resulted from the pore structure like that. It is considered that the pore structure like this increased the density of a three-phase interface in catalyst/proton conductor/fuel, whereby the increase in catalyst utilization efficiency and the high fuel cell properties were provided. When comparing Example 1 with Examples 2, 3, it is seen that the high properties could be obtained by controlling the thickness of the catalyst layer, the thickness of the carbon-metal mixture layer and the number of layers laminated. When comparing Example1 with Examples 9, 10, it is seen that the high properties could be obtained by setting the composition of the carbon-metal mixture layer to $C_{1-x}M_x$ ($0.2 \leqq x \leqq 0.9$).

Note that a similar tendency to that described above was confirmed to exist in a reformed-gas-typed proton exchange membrane electrolyte fuel cell. Consequently, the process of the invention is also effective in a PEMFC.

What is claimed is:

1. A method for producing a catalyst-layer-supporting substrate, comprising:

a lamination step of forming a laminate of metal catalyst layers and mixture layers on a substrate by repeating a first step and a second step plural times alternatively; and an acid treatment step of subjecting the laminate to an acid treatment, wherein the first step is a step of sputtering or depositing a metal catalyst layer, of the metal catalyst layers, that comprises a catalyst, and the second step is a step of sputtering or depositing a mixture layer, of the mixture layers, of carbon and metal, the metal of the mixture layer comprising at least one element M selected from the group consisting of Sn, Al, Cu and Zn, the acid treatment step dissolving the element M partly or wholly.

2. The method according to claim 1, wherein the catalyst of the metal catalyst layer comprises:

a noble metal element; or a noble metal element and at least on element selected from the group consisting of W, Hf, Si, Mo, Ta, Ti, Zr, Ni, Co, Nb, V and Cr.

3. The method according to claim 1, wherein the mixture layer has a composition of $C_{1-x}M_x$,with the provision that x satisfies a condition of $0.2 \leqq x \leqq 0.9$.

4. The method according to claim 1, wherein the metal catalyst layer has a thickness of from 5 nm to 100 nm per one layer.

5. The method according to claim 1, wherein the mixture layer has a thickness of 10 nm to 150 nm per one layer.

6. The method according to claim 1, wherein each of the first step and the second step is repeated from 5 times to 100 times alternatively.

7. A method for producing a membrane-electrode assembly, the membrane-electrode assembly comprising:

a proton conductive substrate material comprising a catalyst layer on each of both main surfaces thereof; and a pair of electron conductive substrate materials holding the proton conductive substrate material therebetween, wherein the proton conductive substrate material is a catalyst-layer-supporting substrate produced by the method according to claim 1.

8. A method for producing a membrane-electrode assembly, the membrane-electrode assembly comprising:

a first electron conductive substrate material comprising a first catalyst layer on one of main surfaces thereof;

a second electron conductive substrate material comprising a second catalyst layer on one of main surfaces thereof; and a proton conductive substrate material provided between the first electron conductive substrate material and the second electron conductive substrate so as to be in contact with the first catalyst layer and the second catalyst layer, wherein at least one of the first electron conductive substrate layer and the second electron conductive substrate layer is a catalyst-layer-supporting substrate produced by the method according to claim 1.

9. A method for producing a fuel cell, the fuel cell comprising a membrane-electrode assembly produced by the method according to claim 7.

10. A method for producing a fuel cell, the fuel cell comprising a membrane-electrode assembly produced by the method according to claim 8.

11. The method according to claim 1, wherein the acid treatment step dissolves the element M partly or wholly so as to form pores in the mixture layer of the laminate.

12. The method according to claim 1, wherein the catalyst of the metal catalyst layer consists of:

a noble metal element; or a noble metal element and at least on element selected from the group consisting of W, Hf, Si, Mo, Ta, Ti, Zr, Ni, Co, Nb, V and Cr.

13. The method according to claim 1, wherein the mixture layer consists of carbon and at least one element M selected from the group consisting of Sn, Al, Cu and Zn.

14. The method according to claim 13, wherein the mixture layer has a composition of $C_{1-x}M_x$, with the provision that x satisfies a condition of $0.2 \leqq x \leqq 0.9$.

15. The method according to claim 1, wherein the repeating of the first step and the second step plural times alternatively is performed with each of the metal catalysts layers having a common composition and with each of the mixture layers having a common composition.

* * * * *